United States Patent
Kuwabara

(10) Patent No.: US 6,515,286 B2
(45) Date of Patent: Feb. 4, 2003

(54) SOLID-STATE RADIATION DETECTOR IN WHICH SIGNAL CHARGES ARE REDUCED BELOW SATURATION LEVEL

(75) Inventor: Takao Kuwabara, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 121 days.

(21) Appl. No.: 09/834,887

(22) Filed: Apr. 16, 2001

(65) Prior Publication Data

US 2001/0038076 A1 Nov. 8, 2001

(30) Foreign Application Priority Data

Apr. 14, 2000 (JP) ........................................ 2000-114043

(51) Int. Cl.⁷ .............................................. H01L 27/00
(52) U.S. Cl. .............................. 250/370.11; 250/370.06
(58) Field of Search ....................... 250/370.11, 370.01, 250/370.06, 484.2, 208.1; 257/712, 469, 706, 707, 720; 378/28; 358/471

(56) References Cited

U.S. PATENT DOCUMENTS

| | | | | |
|---|---|---|---|---|
| 4,803,359 A | | 2/1989 | Hosoi et al. | 250/327.2 |
| 5,574,284 A | * | 11/1996 | Farr | 250/370.06 |
| 5,801,385 A | * | 9/1998 | Endo et al. | 250/370.11 |
| 6,049,074 A | * | 4/2000 | Endo et al. | 250/208.1 |
| 6,229,877 B1 | * | 5/2001 | Agano | 378/154 |

FOREIGN PATENT DOCUMENTS

| | | | | |
|---|---|---|---|---|
| JP | 59-211263 | 11/1984 | | H01L/27/14 |
| JP | 2-164067 | 6/1990 | | H01L/27/146 |
| JP | 2000-60843 | 2/2000 | | A61B/6/06 |
| WO | 92/06501 | 4/1992 | | H01L/27/14 |

OTHER PUBLICATIONS

SPIE, L.E. Antonuk, et al. "Signal, noise, and readout considerations in the development of amorphous silicon photodiode arrays for radiotherapy and diagnostic x–ray imaging" vol. 1443, 1991, pp. 108–119.

* cited by examiner

Primary Examiner—Constantine Hannaher
Assistant Examiner—Otilia Gabor
(74) Attorney, Agent, or Firm—Sughrue Mion, PLLC

(57) ABSTRACT

In a radiation detector: a CsI:Tl (or CsI:Na) scintillator receives a number X of radiation quantums for each pixel, and emits a number L of photons constituting fluorescent light in response to each radiation quantum; photoelectric converters containing Si (or Se) as a main component are arranged corresponding to respective pixels to receive the fluorescent light with an entrance efficiency T, and generate charges when the fluorescent light is detected; and a capacitor is connected to each photoelectric converter, and stores the charges generated by the photoelectric converter. When the radiation detector receives a 10 to 300 mR dose of the radiation, the numbers X and L, the entrance efficiency T, the fill factor F and the photoelectric conversion efficiency $\eta$ of each photoelectric converter, and the maximum storable charge amount Q of the capacitor satisfy a relationship $X \cdot L \cdot T \cdot F \cdot \eta \leq Q$.

10 Claims, 5 Drawing Sheets

SOLID-STATE RADIATION DETECTOR IN WHICH SIGNAL CHARGES ARE REDUCED BELOW SATURATION LEVEL

CROSS-REFERENCE TO RELATED APPLICATIONS

The subject matters disclosed in this specification are related to the subject matters disclosed in the copending, commonly-assigned U.S. Ser. No. 09/376,349 now U.S. Pat. No. 6,229,877 filed by Toshitaka Agano on Aug. 18, 1999 and entitled "Radiation Image Recording and Read-out Method and Apparatus" corresponding to Japanese Patent Application No. 10(1998)-231294, which is disclosed in Japanese Unexamined Patent Publication No. 2000-60843. The contents of the above copending, commonly-assigned U.S. patent application and the corresponding Japanese patent application are incorporated in this specification by reference.

BACKGROUND OF THE INVENTION

1. Field of the Invention

The present invention relates to a radiation detector in which radiographic image information is recorded by converting radiation to fluorescent light in a scintillator, and detecting the fluorescent light by photoelectric converters so that the recorded radiographic image information can be read out.

2. Description of the Related Art

Currently, various radiographic image record-and-readout apparatuses using a solid-state radiation detector are proposed and practically used in radiography in the field of medical diagnosis or the like. In the solid-state radiation detector, charges are generated and temporarily stored in charge storing portions of solid-state detector elements when radiation is detected. Thereafter, the stored charges are converted to an electric signal representing radiographic image information, and then the electric signal is output. In addition, various types of solid-state radiation detectors have been proposed for use in the above image record-and-readout apparatuses. When the solid-state radiation detectors are classified by charge generation process, the so-called optical-conversion type solid-state radiation detectors are known, for example, as disclosed in Japanese Unexamined Patent Publication Nos. 59(1984)-211263, 2(1990)-164067, PCT International Publication No. WO92/06501, and Larry E. Antonuk et al., "Signal, noise, and readout considerations in the development of amorphous silicon photodiode arrays for radiotherapy and diagnostic x-ray imaging," SPIE Proceedings Vol.1443 ("Medical Imaging V: Image Physics") 1991, pp. 108–119. In the optical-conversion type solid-state radiation detectors, a scintillator is exposed to radiation, and converts the radiation to fluorescent light, photoelectric conversion elements (photodiodes) detect the fluorescent light, and generate signal charges the amounts of which corresponds to the intensities of the fluorescent light (i.e., the intensities of the radiation) at the locations of the photoelectric conversion elements, and capacitor elements respectively connected to the photoelectric conversion elements store the signal charges, where the photoelectric conversion elements are made of a semiconductor such as silicon and selenium. In order to obtain an electric signal (image signal) representing the amounts of the signal charges stored in the capacitor elements, the so-called TFT readout method is used. According to the TFT readout method, switches, e.g., thin-film transistors (TFTs), are arranged at midpoints of signal lines respectively connected to the above capacitor elements, and the switches are sequentially driven in a scanning order.

When radiation is detected by a solid-state radiation detector which is formed with a combination of a scintillator and photoelectric conversion elements as described above, the scintillator is required to have high emission efficiency in order to reduce an exposure dose in a patient. In addition, the radiation absorption in the scintillator is required to be great in order to reduce quantization noise and achieve emission of a great amount of fluorescent light, although generally, transmittance of radiation through material is high, and radiation produces quantization noise. Further, the scintillator is required to have a wavelength-light emission characteristic which matches well to the wavelength-sensitivity (spectroscopic sensitivity) characteristic of the photoelectric conversion elements.

When the above solid-state radiation detector of the optical conversion type is used in applications in which a highly sharp image is required, e.g., in medical X ray imaging, usually, the photoelectric conversion elements are arranged at a pixel pitch of 50 to 200 micrometers, where the pixel pitch corresponds to the pixel size.

On the other hand, since layers which constitute each photoelectric conversion element have a dielectric property, the capacitor elements are usually realized by the photoelectric conversion elements per se. Therefore, the capacitance of each capacitor element is determined by the pixel pitch, and as small as 0.5 to 2 pF. Further, the maximum storable charge amount of each capacitor element is also small.

In addition, in order to increase the radiation absorption in the scintillator, usually, the thickness of the scintillator is increased, and scintillators having a thickness of about 500 micrometers are widely used.

However, when the thickness of the scintillator is increased, the amount of the fluorescent light emitted from the scintillator increases, and the amounts of charges generated in the photoelectric conversion elements also increase. As a result, it is probable that the amount of charges generated in each photoelectric conversion element exceeds the maximum storable charge amount of each capacitor element, i.e., the solid-state radiation detector is saturated. Therefore, X ray imaging can be performed only with a low radiation dose. In other words, it is impossible to secure a sufficient dynamic range of the radiation dose.

For example, even when solid-state radiation detectors include a CsI:Tl scintillator and a photoelectric conversion element containing Si as a main component and having a wavelength-sensitivity characteristic matched with the wavelength-light emission characteristic of the CsI:Tl scintillator, or a CsI:Na scintillator and a photoelectric conversion element containing Se as a main component and having a wavelength-sensitivity characteristic matched with the wavelength-light emission characteristic of the CsI:Na scintillator, the solid-state radiation detectors have a dynamic range as narrow as 7 to 10 mR, which corresponds to the saturation limit.

SUMMARY OF THE INVENTION

An object of the present invention is to provide a radiation detector which realizes a sufficiently large dynamic range of a radiation dose even when the amount of radiation absorption in a scintillator is increased in order to reduce quantization noise.

In order to achieve the above object, according to the present invention, the amounts of charges generated by photoelectric conversion elements are reduced while maintaining great radiation absorption in the scintillator.

Specifically, according to the first aspect of the present invention, there is provided a radiation detector comprising a scintillator, a plurality of photoelectric conversion elements, and a plurality of capacitor elements. The scintillator is made of CsI:Tl (CsI doped with Tl) receives radiation corresponding to a number X of radiation quantums for each of a plurality of pixels, and converts the radiation to fluorescent light so that a number L of photons which constitute the fluorescent light are emitted in response to each radiation quantum. Each of the plurality of photoelectric conversion elements is provided for one of the plurality of pixels, contains Si as a main component, detects the fluorescent light, and generates charges when the fluorescent light is detected, where each of the plurality of photoelectric conversion elements has a fill factor F and a photoelectric conversion efficiency η, and is arranged so that the fluorescent light enters each of the plurality of photoelectric conversion elements with an entrance efficiency T. Each of the plurality of capacitor elements is connected to one of the plurality of photoelectric conversion elements, stores the charges generated by the one of the plurality of photoelectric conversion elements, and has a maximum storable charge amount Q. When the radiation detector receives a 10 to 300 mR dose of the radiation, the number X of radiation quantums, the number L of photons of the fluorescent light, the entrance efficiency T, the fill factor F, and the photoelectric conversion efficiency η satisfy a relationship X·L·T·F·η≦Q.

The left side of the above inequality corresponds to the amount of the charges generated by each photoelectric conversion element when the radiation detector is exposed to a radiation dose determined by the above number X. Therefore, the above relationship indicates that the amount of the charges generated by each photoelectric conversion element is not greater than the maximum storable charge amount Q of each capacitor element in the desirable range of the radiation dose, 10 to 300 mR. Thus, when the above relationship is satisfied, a sufficiently large dynamic range of the radiation dose can be realized even when the amount of radiation absorption in the scintillator is increased in order to reduce quantization noise.

Preferably, the radiation detector according to the first aspect of the present invention also has one or any possible combination of the following additional features (i) to (iv).

(i) The radiation detector according to the first aspect of the present invention may further comprise a light-absorbing member arranged between the scintillator and the plurality of photoelectric conversion elements so as to decrease the entrance efficiency T.

(ii) The relationship can be satisfied by differently arranging the wavelength-light emission characteristic of the scintillator and the wavelength-sensitivity characteristic of each of the plurality of photoelectric conversion elements so as to decrease the photoelectric conversion efficiency η.

(iii) The relationship can be satisfied by decreasing the number L of photons constituting the fluorescent light.

(iv) The plurality of pixels are two-dimensionally arranged, and the plurality of photoelectric conversion elements and the plurality of capacitor elements are arranged corresponding to the plurality of pixels, and integrally formed with the scintillator. When the plurality of photoelectric conversion elements and the plurality of capacitor elements are integrally formed with the scintillator, it is possible to reduce the amount of blur which is caused by gaps between the scintillator and the plurality of photoelectric conversion elements. In addition, the size of the radiation detector can be reduced. Alternatively, when the plurality of photoelectric conversion elements and the plurality of capacitor elements are formed separately from the scintillator, the characteristics of the respective constituents can be independently arranged so that the above relationship is satisfied, i.e., flexibility and replaceability is increased.

Alternatively, according to the second aspect of the present invention, there is provided a radiation detector comprising a scintillator, a plurality of photoelectric conversion elements, and a plurality of capacitor elements. The scintillator is made of CsI:Na (CsI doped with Na), receives radiation corresponding to a number X of radiation quantums for each of a plurality of pixels, and converts the radiation to fluorescent light so that a number L of photons which constitute the fluorescent light are emitted in response to each radiation quantum. Each of the plurality of photoelectric conversion elements is provided for one of the plurality of pixels, contains Se as a main component, detects the fluorescent light, and generates charges when the fluorescent light is detected, where each of the plurality of photoelectric conversion elements has a fill factor F and a photoelectric conversion efficiency η, and is arranged so that the fluorescent light enters each of the plurality of photoelectric conversion elements with an entrance efficiency T. Each of the plurality of capacitor elements is connected to one of the plurality of photoelectric conversion elements, stores the charges generated by the one of the plurality of photoelectric conversion elements, and has a maximum storable charge amount Q. When the radiation detector receives a 10 to 300 mR dose of the radiation, the number X of radiation quantums, the number L of photons of the fluorescent light, the entrance efficiency T, the fill factor F, and the photoelectric conversion efficiency η satisfy a relationship X·L·T·F·η≦Q.

Preferably, the radiation detector according to the second aspect of the present invention also has one or any possible combination of the aforementioned additional features (i) to (iv).

DESCRIPTION OF PREFERRED EMBODIMENTS

An embodiment of the present invention is explained in detail below with reference to drawings.

Construction

Figure 1:
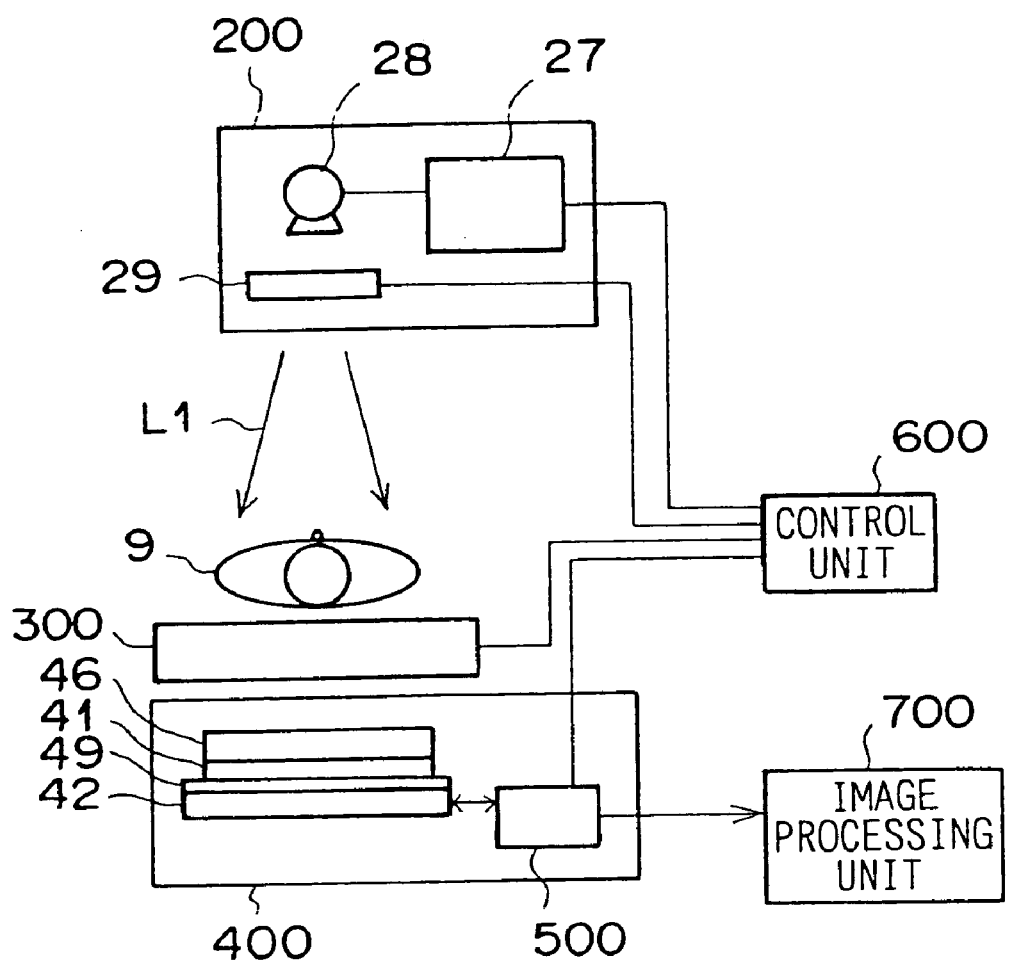
FIG. 1 is a diagram illustrating an outline of a construction of a radiographic-image pickup-and-readout system using a solid-state radiation detector as an embodiment of the present invention.

FIG. 1 is a diagram illustrating an outline of a construction of a radiographic-image pickup-and-readout system using a solid-state radiation detector as an embodiment of the present invention. The radiographic-image pickup and readout system of FIG. 1 comprises an X-ray generating unit 200, a record-and-readout unit 400, a control unit 600, and an image processing unit 700.

The X-ray generating unit 200 comprises a high-voltage power supply 27, a radiation source 28, and an X-ray aperture 29. The radiation source 28 is driven by the high-voltage power supply 27, and emits an X-ray beam L1. The high-voltage power supply 27 is controlled by the control unit 600. The X-ray aperture 29 shapes the X-ray beam L1 under control of the control unit 600 so that only an imaging area is exposed to the X-ray beam L1 even when the imaging area is varied. The shaped X-ray beam L1 is directed to the subject 9 lying on a bed 300, which is transparent to X rays, and can be moved under control of the control unit 600 in a plane perpendicular to the direction of the X-ray beam L1. The record-and-readout unit 400 is exposed to portions of the X-ray beam L1 which have passed through the subject 9 and the bed 300.

The record-and-readout unit 400 comprises a scintillator 41, a solid-state radiation detector 42, and a drive-and-detection circuit 500, where the solid-state radiation detector 42 is a two-dimensional detector which behaves as a two-dimensional image record-and-readout unit. A grid plate 46 is arranged on the radiation-source side of the scintillator 41 in order to guide to the scintillator 41 only portions of the radiation which come from a specific direction. The scintillator 41 and the solid-state radiation detector 42 can be integrally formed. As explained later, when necessary, a light absorbing member 49 is arranged between the scintillator 41 and the solid-state radiation detector 42. In this case, the scintillator 41, the light absorbing member 49, and the solid-state radiation detector 42 can be integrally formed.

The grid plate 46 is provided for reducing the influences of X ray scattering which is caused by passage of X rays through the subject 9, and has a striped structure formed by alternately arranging at a predetermined grid pitch a material of low X-ray absorption (i.e., a material transparent to radiation) such as Al and a material of high X-ray absorption such as Pb. Therefore, X rays scattered by the subject 9 are absorbed by the material of high X-ray absorption in the grid plate 46, and thus the deterioration of image quality due to the scattered radiation can be prevented. In order to prevent appearance of moire patterns which are produced according to the ratio between the pixel pitch of the solid-state radiation detector 42 and the grid pitch of the grid plate 46, the solid-state radiation detector 42 and the grid plate 46 can be arranged to have a predetermined relationship between the pixel pitch of the solid-state radiation detector 42 and the grid pitch of the grid plate 46, as disclosed in the coassigned U.S. Ser. No. 09/376,349 corresponding to Japanese Unexamined Patent Publication No. 2000-60843. Alternatively, the appearance of moire patterns can be prevented by vibrating the grid plate 46.

In the scintillator 41, the constituent material of the scintillator 41 is excited by X rays (which have relatively high energy), i.e., the X rays are absorbed by the constituent material of the scintillator 41, and fluorescent light in a visible wavelength range is emitted by radiative recombination, where the fluorescent light has recombination energy.

As explained later, photoelectric conversion elements used in this embodiment contain amorphous silicon (a-Si) as a main component. In this case, the scintillator 41 is made of CsI:Tl (CsI doped with Tl), where CsI:Tl has a wavelength-light emission characteristic which is well matched with the wavelength-sensitivity characteristic of the photoelectric conversion elements containing the amorphous silicon (a-Si). Alternatively, when the scintillator 41 is made of CsI:Na (CsI doped with Na), photoelectric conversion elements containing amorphous selenium (a-Se) as a main component are used, since wavelength-light emission characteristic of the scintillator 41 made of CsI:Na is well matched with the wavelength-sensitivity characteristic of the photoelectric conversion elements the containing amorphous selenium (a-Se).

The solid-state radiation detector 42 comprises an insulator substrate, a plurality of photoelectric conversion elements 44, a plurality of switching elements 45, a plurality of signal lines, and a plurality of scanning lines. For example, the insulator substrate is made of quartz glass, and has a thickness of 3 mm. The plurality of photoelectric conversion elements 44 correspond to a plurality of pixels, respectively, and are arranged at predetermined pitches in X and Y directions, on the insulator substrate. That is, the plurality of photoelectric conversion elements 44 are arranged in a matrix arrangement (including a plurality of rows and a plurality of columns) on the insulator substrate. Each of the plurality of photoelectric conversion elements 44 is formed with an amorphous semiconductor film sandwiched between a transparent conductive film and a conductive film. Each of the plurality of switching elements 45 is realized by, for example, a thin-film transistor (TFT), and transfers to the drive-and-detection circuit 500 signal charges which are generated by photoelectric conversion in one of the plurality of photoelectric conversion elements 44 connected to the switching element. Thus, the plurality of switching elements 45 are also arranged in a matrix arrangement (including a plurality of rows and a plurality of columns). The plurality of scanning lines and the plurality of signal lines are formed by a pattern formation technique so that the plurality of scanning lines intersect with the plurality of scanning lines at right angles, each of the plurality of scanning lines is connected to switching elements in one of the plurality of rows in the matrix arrangement of the switching elements 45, and each of the plurality of signal lines is connected to switching elements in one of the plurality of columns in the matrix arrangement. The drive-and-detection circuit 500, the photoelectric conversion elements 44, and the like can be formed integrally with the insulator substrate.

Each of the plurality of photoelectric conversion elements 44 is made of a dielectric material, and also has a function of a capacitor element. Therefore, the signal charges generated by photoelectric conversion in each photoelectric conversion element 44 are stored as latent-image charges in the photoelectric conversion element 44.

When radiographic image information is recorded in and read out from the solid-state radiation detector 42 in the radiographic-image pickup-and-readout system of FIG. 1, the solid-state radiation detector 42 is arranged so that the scintillator 41 is located on the side of the radiation source 28, and the scintillator 41 is exposed to radiation (i.e., the aforementioned portions of the X-ray beam L1 which have passed through the subject 9 and the bed 300). The radiation enters the scintillator 41, and is converted to visible light (i.e., the aforementioned fluorescent light in the visible wavelength range). The visible light is further converted to signal charges in each of the plurality of photoelectric conversion elements 44, and the signal charges are then stored as latent-image charges in the photoelectric conversion element 44, as mentioned above, where the latent-image charges represent the radiographic image information. The latent-image charges stored in each photoelectric conversion element 44 are transferred in sequence to the drive-and-detection circuit 500 by driving the plurality of switching elements 45 in a scanning order under control of the control unit 600. Then, the drive-and-detection circuit 500 outputs the latent-image charges to the image processing unit 700 in the form of an image signal. The image processing unit 700 performs desired processing of the image signal, and the processed image signal is output to a CRT display device or the like in order to display the processed radiographic image in the form of a visible image.

Figure 2:
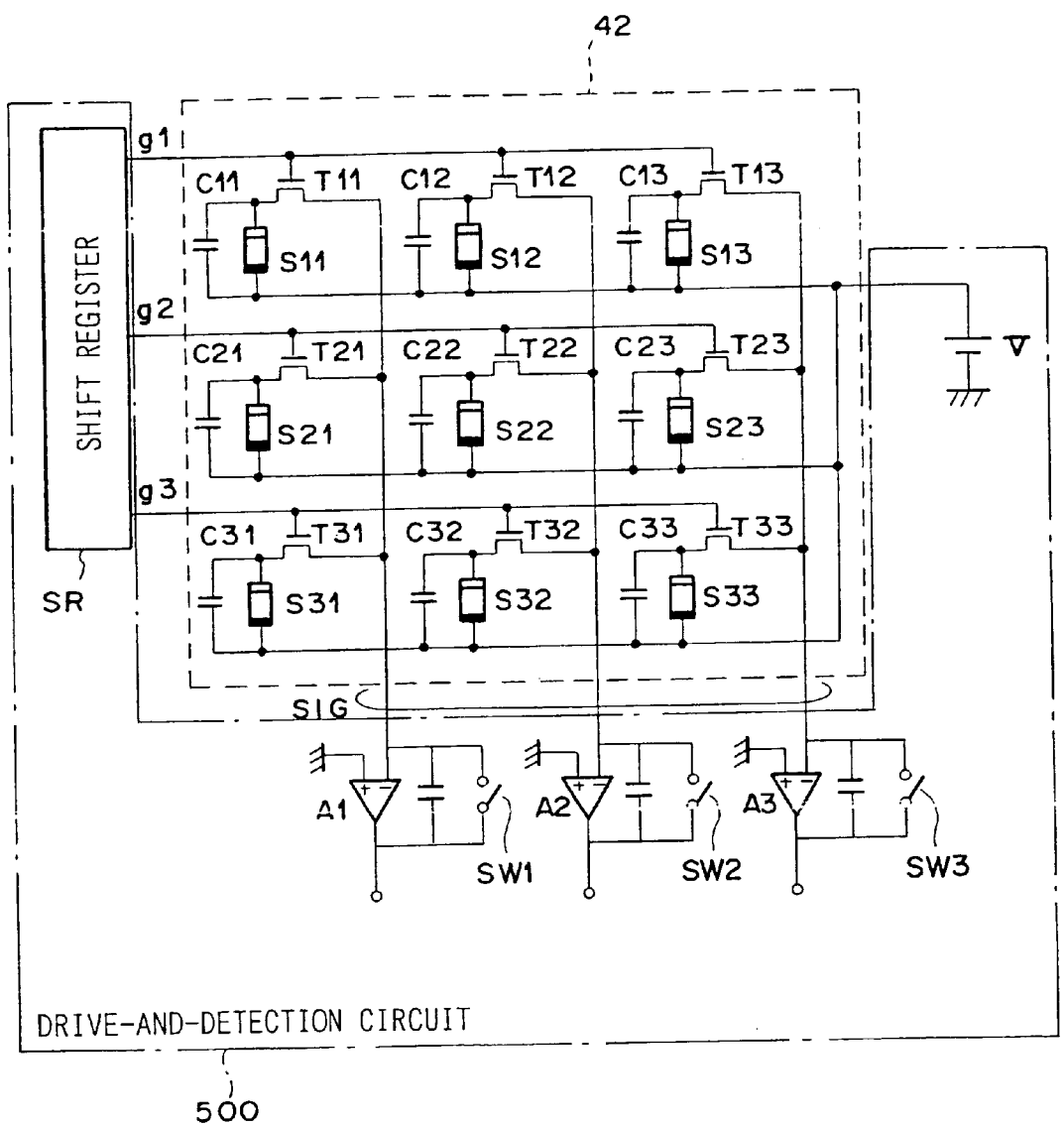
FIG. 2 is a simplified circuit diagram of the solid-state radiation detector and a drive-and-detection circuit connected to the solid-state radiation detector, where only a portion of the solid-state radiation detector corresponding to 3×3 pixels is indicated for the purpose of simple illustration.

FIG. 2 is a simplified circuit diagram of the solid-state radiation detector 42 and the drive-and-detection circuit 500 connected to the solid-state radiation detector 42, where only a portion of the solid-state radiation detector 42 corresponding to 3×3 pixels is indicated for the purpose of simple illustration. In FIG. 2, photoelectric conversion elements 44 are respectively indicated with references S11 to S33, capacitor portions of the photoelectric conversion elements 44 each of which behaves as a capacitor are respectively indicated with references C11 to C33, and the switching elements 45 are respectively indicated with references T11 to T33. Hereinafter, each of the above capacitor portions C11 to C33 may be called a capacitor, and each of the switching elements may be called a TFT.

First, a high-level voltage is applied to all of the control lines g1 to g3 through the shift register SR. Then, all of the TFTs T11 to T33 are turned on, and the capacitors C11 to C33 are charged. Next, a low-level voltage is applied to all of the control lines g1 to g3 through the shift register SR. Then, all of the TFTs T11 to T33 are turned off, and the solid-state radiation detector 42 is initialized.

When X rays are emitted by the X-ray generating unit 200, and incident on the CsI:Tl scintillator in the above situation, the X rays are converted to light, where the light carries information on the structure of the subject, e.g., a patient. Then, the light enters the respective photodiodes S11 to S33, and optical currents I are generated in the respective photodiodes S11 to S33. The optical currents I generated in the photodiodes S11 to S33 discharge the corresponding capacitors C11 to C33, respectively, where the amounts of charges discharged from the capacitors C11 to C33 by the optical currents I correspond to the intensities of the X rays in the pixels in which the photodiodes S11 to S33 are located. Then, a high-level voltage is applied to each of the control lines g1 to g3 in sequence through the shift register SR so as to turn on the TFTs controlled by each of the control lines g1 to g3. At this time, currents flow through the turned-on TFTs until the capacitors connected to the turned-on TFTs are charged again. Therefore, an image signal representing the intensities of the X rays in the pixels, i.e., information on the structure of the subject, can be obtained by detecting the amounts of charges newly stored in the capacitors C11 to C33 by the currents flowing through the turned-on TFTs. The amplifiers A1, A2, and A3 connected to the TFTs are used for detecting the amounts of charges newly stored in the capacitors C11 to C33.

Although only 3×3 pixels are indicated in FIG. 2, the actual solid-state radiation detectors are two-dimensional radiation detectors in which photoelectric conversion elements corresponding to about 500×5,000 pixels to 2,000×2,000 pixels are two-dimensionally arranged at a pixel pitch of 50 to 200 micrometers. The sizes of the solid-state radiation detectors are, for example, about 200×200 mm to 500×500 mm. For example, when a solid-state radiation detector includes 4,096×4,096 pixels, and the size of the solid-state radiation detector is 430×430 mm, the pixel size is about $10^5$ micrometers. At this time, the capacitance of the converter portion of each photoelectric conversion element is about 1.0 pF.

Figure 3:
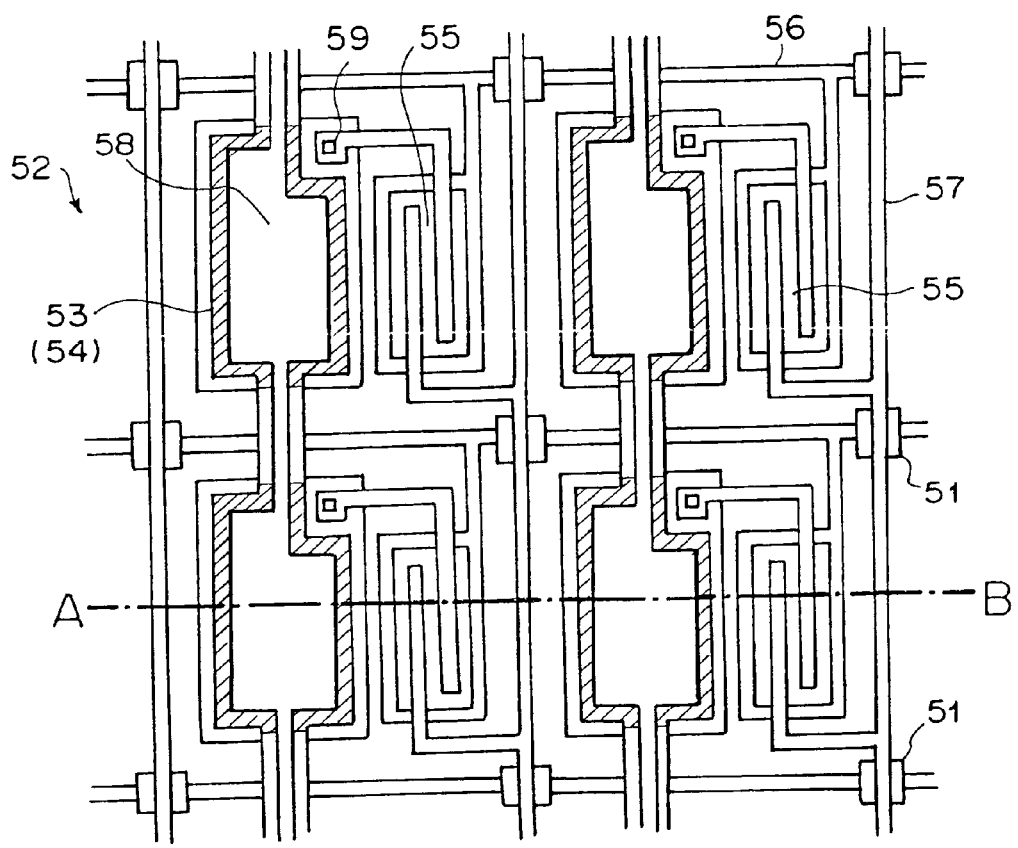
FIG. 3 is a simplified plan view of a portion of the solid-state radiation detector containing Si as a main component.

FIG. 3 is a simplified plan view of a portion of the solid-state radiation detector containing Si as a main component, where only a portion of the solid-state radiation detector corresponding to 2×2 pixels is indicated for the purpose of simple illustration. In FIG. 3, the hatched areas 53 are light-receiving surfaces through which the fluorescent light emitted by the scintillator 41 enters the respective photoelectric conversion elements. In FIG. 3, the photoelectric conversion elements bear a reference numeral 54, the switching elements bear a reference numeral 55, scanning lines bear a reference numeral 56, signal lines bear a reference numeral 57, power lines bear a reference numeral 58, and contact holes bear a reference numeral 59. Each switching element 55 transfers to the drive-and-detection circuit 500 signal charges generated in one of the photoelectric conversion elements 54 connected to the switching element 55. The scanning lines 56 are connected to the switching elements 55, respectively, in order to control the switching elements 55. The signal lines 57 are connected to the drive-and-detection circuit 500. The power lines 58 are connected to the photoelectric conversion elements 54, respectively, in order to supply a bias voltage to the photoelectric conversion elements 54. The contact holes 59 are provided for connecting the photoelectric conversion elements 54 to the corresponding switching element 55, respectively.

Figure 4:
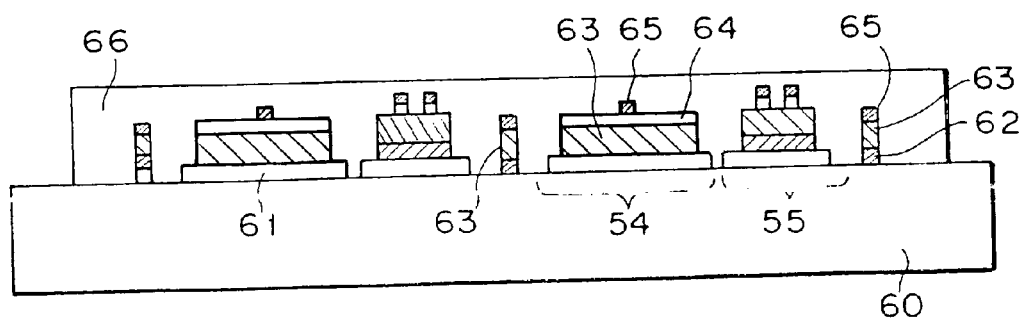
FIG. 4 is a cross-sectional view of the A-B cross section of the solid-state radiation detector of FIG. 3.

FIG. 4 is a cross-sectional view of the A-B cross section of the solid-state radiation detector of FIG. 3. A process for producing the solid-state radiation detector 52 is explained below with reference to FIG. 4.

First, a first metal thin film 61 being made of chromium and having a thickness of about 50 nm is formed on an insulator substrate 60 by a resistive heating evaporation method or a sputtering method, and unnecessary areas of the first metal thin film 61 are removed by photolithographic patterning and etching. The remaining areas of the first metal thin film 61 realize lower electrodes of the photoelectric conversion elements 54 and gate electrodes of the switching elements 55.

Next, an amorphous silicon nitride (a-SiN$_x$) insulator layer 62 having a thickness of about 0.2 micrometers is formed by CVD (chemical vapor deposition). Then, a pattern of the gate insulator layers of the switching elements are formed by removing un necessary portions of the amorphous silicon nitride (a-SiN$_x$) insulator layer 62 by dry etching such as reactive ion etching (RIE), chemical dry etching (CDE), or the like. Next, a hydrogenated amorphous silicon (a-Si:H) photoelectric conversion layer 63 having a thickness of 0.5 micrometers and an n-type carrier barrier layer (N+ layer) 64 having a thickness of about 0.05 micrometers are formed in this order. The a-Si:H photoelectric conversion layer 63 realizes a photoelectric conversion semiconductor layer of each photoelectric conversion element 54 and a semiconductor layer of each switching element 55. The N+ layer 64 realizes a hole injection stop layer of each photoelectric conversion element 54 and an ohmic contact layer of each switching element 55. In addition, the above a-SiN$_x$ insulator layer 62, the a-Si:H photoelectric conversion layer 63, and the N+ layer 64 are used as insulation layers between the first metal thin film 61 and a second metal thin film 65 where the first metal thin film 61 and the second metal thin film 65 overlap as indicated with the reference number 51 in FIG. 3.

After the above layers 61 to 64 are formed, areas at which the contact holes 59 are formed are removed by dry etching such as reactive ion etching (RIE) or chemical dry etching (CDE). Thereafter, the second metal thin film 65 being made of aluminum and having a thickness of about 1 micrometer is formed by resistive heating evaporation or sputtering, and unnecessary areas of the second metal thin film 65 are removed by photolithographic patterning and etching. The remaining areas of the second metal thin film 65 realize upper electrodes of the photoelectric conversion elements 54, source and drain electrodes of the switching elements 55, and other wiring (including the signal lines 57, and the power lines 58). In addition, while the second metal thin film 65 is formed, the first and second metal thin films 61 and 65 are electrically connected through the contact holes 59.

Further, in order to form channel portions of the switching elements 55, portions of the areas between the source and drain electrodes are removed by reactive ion etching (RIE). Thereafter, unnecessary areas of the a-Si:H photoelectric conversion layer 63 and the N+ layer 64 are removed by reactive ion etching (RIE) so that the respective elements are separated from each other. Thus, the photoelectric conversion elements 54, the switching elements 55, the scanning lines 56, the signal lines 57, and the power lines 58 are formed. Although only two pixels are indicated in FIG. 4, actually, the structures as explained above are formed for a large number of pixels at the same time on the insulator substrate 60. Finally, in order to increase moisture resistance, a passivation (protection) film 66 made of SiN$_x$ is formed over the above structure so that the above elements and wiring are covered by the passivation (protection) film 66.

As explained above, the photoelectric conversion elements 54, the switching element 55, and wiring can be produced merely by formation of the first metal thin film 61, the a-SiN$_x$ insulator layer 62, the a-Si:H photoelectric conversion layer 63, the N+ layer 64, and the second metal thin film 65, and etching, and the above layers 61 to 65 are each common to all of the elements. Therefore, the conventional CVD (chemical vapor deposition) systems and sputtering systems can be readily used. In addition, the manufacturing process is simple, and the number of the manufacturing steps is small. Thus, a high-performance, optical-conversion type two-dimensional image-readout apparatus having a great effective area can be manufactured at low cost and a high yield rate.

In the above explanations, the polarities of the carriers (electrons and holes) can be reversed. For example, the carrier barrier layer 64 can be realized by a p-type material. In this case, the polarities of the voltages and the electric fields should also be reversed, and the other portions of the solid-state radiation detector 52 should be formed accordingly. Thus, a solid-state radiation detector which has the same functions as the solid-state radiation detector 52 explained with reference to FIGS. 2 to 4 can be realized even when the polarities of the carriers are reversed.

In addition, the a-Si:H photoelectric conversion layer 63 may be replaced with any other photoelectric conversion layer in which pairs of an electron and a hole are generated when light enters the photoelectric conversion layer. Further, the photoelectric conversion layer may have a multilayer structure.

Furthermore, each switching element can be realized by any structure which comprises a gate electrode, a gate insulation film, a semiconductor layer in which a channel can be formed, an ohmic contact layer, and a main electrode. For example, the ohmic contact layer can be realized by a p-type material. In this case, the polarity of the voltage applied to the gate electrode is reversed, and holes are used as carriers.

Methods for Increasing Dynamic Range

Relationships between constructions of solid-state radiation detectors and the dynamic ranges of radiation doses in the solid-state radiation detectors are considered below.

As mentioned before, when the pixel size is 50 to 200 micrometers, the capacitance of the capacitor portion of each photoelectric conversion element which stores the signal charges is as small as 0.5 to 2 pF, and therefore the maximum storable charge amount Q in each photoelectric conversion element is also small. For example, the maximum storable charge amount Q of a capacitor portion of each photoelectric conversion element for a pixel is expressed as $$Q = C \times V / e$$

where C is the capacitance (in farads) of the capacitor portion of each photoelectric conversion element for a pixel, V is the voltage (in volts) applied to the capacitor element, e is the elementary charge (in coulombs), i.e., $1.6 \times 10^{-19}$ coulombs, and the maximum storable charge amount Q is expressed by the number of electrons.

Figure 5:
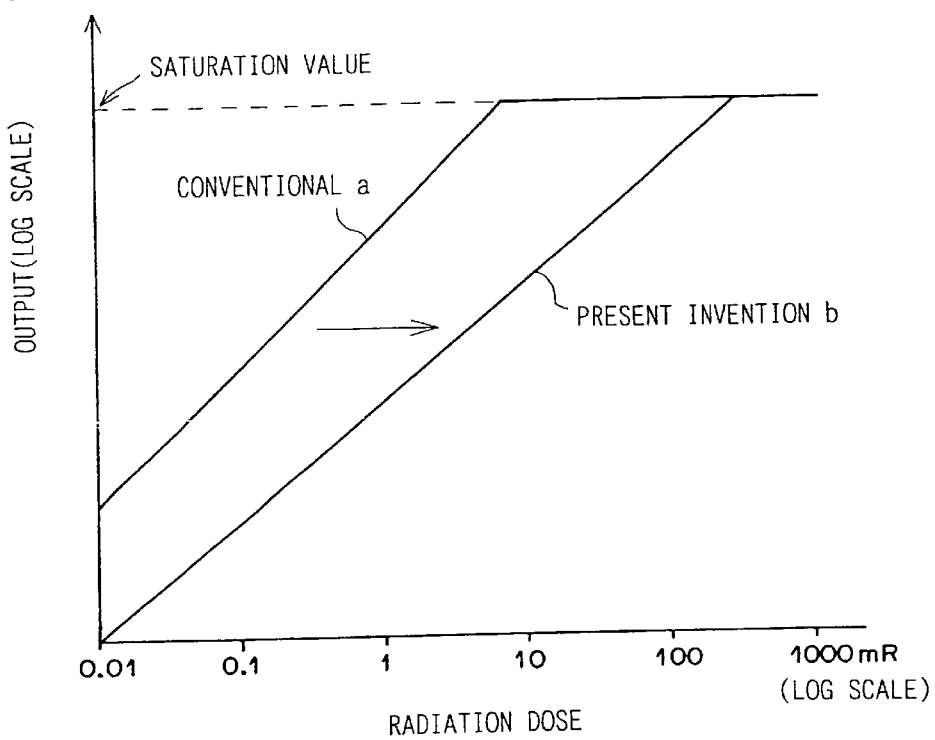
FIG. 5 is a graph indicating the increase in the dynamic range of the radiation dose as the effect of the present invention.

As mentioned before, in order to reduce the quantization noise, the radiation absorption in the scintillator must be increased, and therefore the thickness of the scintillator must be increased. For example, a scintillator having a thickness of about 500 micrometers is used. However, when the thickness of the scintillator is increased, the amount of the fluorescent light emitted from the scintillator increases, and the amount of charges generated in each photoelectric conversion element also increases. For example, when a solid-state radiation detector includes a CsI:Tl scintillator and a photoelectric conversion element containing Si as a main component, the dynamic range (saturation limit) of the radiation dose is about 7 to 10 mR, as indicated in FIG. 5, which shows the radiation dose-output characteristics of the conventional solid-state radiation detector (indicated by the line a) and a solid-state radiation detector according to the present invention (indicated by the line b). That is, in the conventional solid-state radiation detector, the amount of the charges generated in each photoelectric conversion element is likely to exceed the maximum storable charge amount Q, i.e., to be saturated. Therefore, imaging can be performed only with a small radiation dose which does not saturate the solid-state radiation detector. That is, conventionally, it is impossible to secure a sufficient dynamic range of the radiation dose.

The amount Q0 of charges which are generated in each photoelectric conversion element when the photoelectric conversion element is exposed to radiation can be expressed as $$Q0 = X \cdot L \cdot T \cdot F \cdot \eta,$$

where X is the number of radiation quantums received in each pixel, L is the number of photons which constitute fluorescent light emitted in response to each radiation quantum, T is the entrance efficiency with which the fluorescent light enters each photoelectric conversion element, F is the fill factor of each photoelectric conversion element, and η is the photoelectric conversion efficiency of each photoelectric conversion element. Therefore, when the amount Q0 of charges generated in each photoelectric converter is controlled so as not to exceed the maximum storable charge amount Q, a sufficient dynamic range of the radiation dose can be secured. That is, it is required that the above parameters X, L, T, F, and η satisfy the following relationship $Q0 = X \cdot L \cdot T \cdot F \cdot \eta \leq Q$. Further, it is sufficient that the above relationship is satisfied when the radiation dose is within a practically desirable range of 10 to 300 mR.

Since the number X of radiation quantums received in each pixel is proportional to the radiation dose, the above relationship is required to be held with the maximum number X of radiation quantums corresponding to the maximum detected radiation dose. In addition, in the solid-state radiation detectors in which the photoelectric conversion elements are also used as a capacitor, the amount of charges generated in each photoelectric conversion element and the capacitance of each photoelectric conversion element are proportional to the area of each photoelectric conversion element. Therefore, the amount Q0 of charges generated in each photoelectric conversion element cannot be reduced by changing the fill factor F, since the maximum storable charge amount Q decreases with decrease in the fill factor F. Consequently, in order to satisfy the above relationship, one of the entrance efficiency T, the number L, and the photoelectric conversion efficiency η, or a product of two or all of the entrance efficiency T, the number L, and the photoelectric conversion efficiency η must be reduced. Thus, a sufficient dynamic range of the radiation dose can be secured while maintaining great radiation absorption in the scintillator and suppressing the quantization noise. Three methods for reducing the amount Q0 of charges generated in each photoelectric conversion element are indicated below.

(1) First Method

According to the first method, the aforementioned light absorption member 49 (i.e., a member which absorbs the fluorescent light) is arranged between the scintillator 41 and the photoelectric conversion elements 44 so that the entrance efficiency T is reduced due to a small transmittance of the light absorbing member 49.

(2) Second Method

According to the second method, the wavelength-light emission characteristic of the scintillator and the wavelength-sensitivity characteristic of the photoelectric conversion elements are differently arranged so that the photoelectric conversion efficiency η is decreased.

The center wavelength of fluorescent light emitted from the CsI:Tl scintillator (i.e., the wavelength at which the fluorescent light emitted from the CsI:Tl scintillator is locally maximized) is 565 nm (according to Keikoutai Dougakukai ed., "Fluorescent Material Handbook," Ohm-sha, Japan, 1987), while it is known that the sensitivity of the a-Si photodiode is high to green light in the wavelength range of approximately 560 to 580 nm. Therefore, the center wavelength in the sensitivity of the a-Si photodiode is shifted so that the photoelectric conversion efficiency η at the center wavelength, 565 nm, of fluorescent light emitted from the CsI:Tl scintillator is reduced (optimized).

In practice, the light absorption characteristics of the photoelectric conversion element varies with the band gap in the photoelectric conversion element, and the band gap depends on the dopant as an impurity and the doped amount. Therefore, the wavelength-sensitivity characteristic of the photoelectric conversion element can be changed by appropriately adjusting the impurity doping. Alternatively, the band gap in the photoelectric conversion element can be changed by changing a film formation condition. In another alternative, the film thickness of the a-Si:H photoelectric conversion layer 63 is decreased. In this case, the capacitance C of each photoelectric conversion element is increased, the amount of light absorbed by each photoelectric conversion element is decreased. Therefore, it is possible to increase the maximum storable charge amount Q, and decrease the photoelectric conversion efficiency η.

(3) Third Method

According to the third method, the number L of photons which constitute fluorescent light emitted in response to each radiation quantum is reduced by employing as the scintillator 41 a scintillator which emits a small amount of fluorescent light. Generally, the amount of fluorescent light emitted from a scintillator can be controlled by appropriately adjusting the concentration of an activator in the scintillator. For example, in the CsI:Tl scintillator, it is conventionally considered that the optimum concentration of Tl as an activator is 6 ppm, where the concentration of Tl is expressed in gram atoms per mol. The amount of fluorescent light emitted from the CsI:Tl scintillator can be controlled by appropriately changing the concentration of Tl in the CsI:Tl scintillator from the conventionally optimum concentration.

The above first to third methods can be used similarly in the case where the solid-state radiation detectors include a CsI:Na scintillator and a photoelectric conversion element containing Se as a main component. For example, the center wavelength of fluorescent light emitted from the CsI:Na scintillator (i.e., the wavelength at which the fluorescent light emitted from the CsI:Na scintillator is locally maximized) is 420 nm (according to Keikoutai Dougakukai ed., "Fluorescent Material Handbook," Ohm-sha, Japan, 1987), while it is known that the sensitivity of the a-Se photodiode is high to blue light in the wavelength range of approximately 400 to 430 nm. Therefore, the center wavelength in the sensitivity of the a-Se photodiode can be shifted so that the photoelectric conversion efficiency η at the center wavelength, 420 nm, of fluorescent light emitted from the CsI:Na scintillator is reduced (optimized)

The above first to third methods can be used singly or in combination. However, it is relatively easy to satisfy the aforementioned relationship when the above methods are used in combination. In addition, it is more preferable to use the above methods in combination when the radiation dose is greater.

Concrete Examples

Concrete examples of the solid-state radiation detectors according to the present invention are indicated below for various amounts of the radiation dose. In the following examples, the solid-state radiation detectors include a typical CsI:Tl scintillator and a typical photoelectric conversion element containing Si as a main component, the capacitance C of the capacitor portion of each photoelectric conversion element is 2 pF, the voltage V applied to each photoelectric conversion element is 5 V, the maximum storable charge amount Q is $6 \times 10^7$e (where e is the elementary charge), the number L of photons which constitute fluorescent light emitted from the CsI:Tl scintillator in response to each radiation quantum is 2,000, the entrance efficiency T is 80%, the fill factor F of each photoelectric conversion element is 70%, and the photoelectric conversion efficiency η of each photoelectric conversion element is 80%.

(1) Case 1

In the case 1, the radiation dose is 10 mR, and the number X of radiation quantums received in each pixel is $7 \times 10^4$.

(1-1) First Method (Use of Light Absorbing Member)

According to the first method, an optical filter as the aforementioned light absorption member 49 is arranged between the scintillator 41 and the solid-state radiation detector 42, where the optical filter realizes an entrance efficiency T of 50%. In this case, the amount Q0 of charges generated in each photoelectric conversion element becomes $Q0=X \cdot L \cdot T \cdot F \cdot \eta = 3.9 \times 10^7$, which is not greater than the maximum storable charge amount $Q=6 \times 10^7$. That is, the aforementioned relationship $Q0=X \cdot L \cdot T \cdot F \cdot \eta \leq Q$ is satisfied.

(1-2) Second Method (Doping Control)

Figure 6:
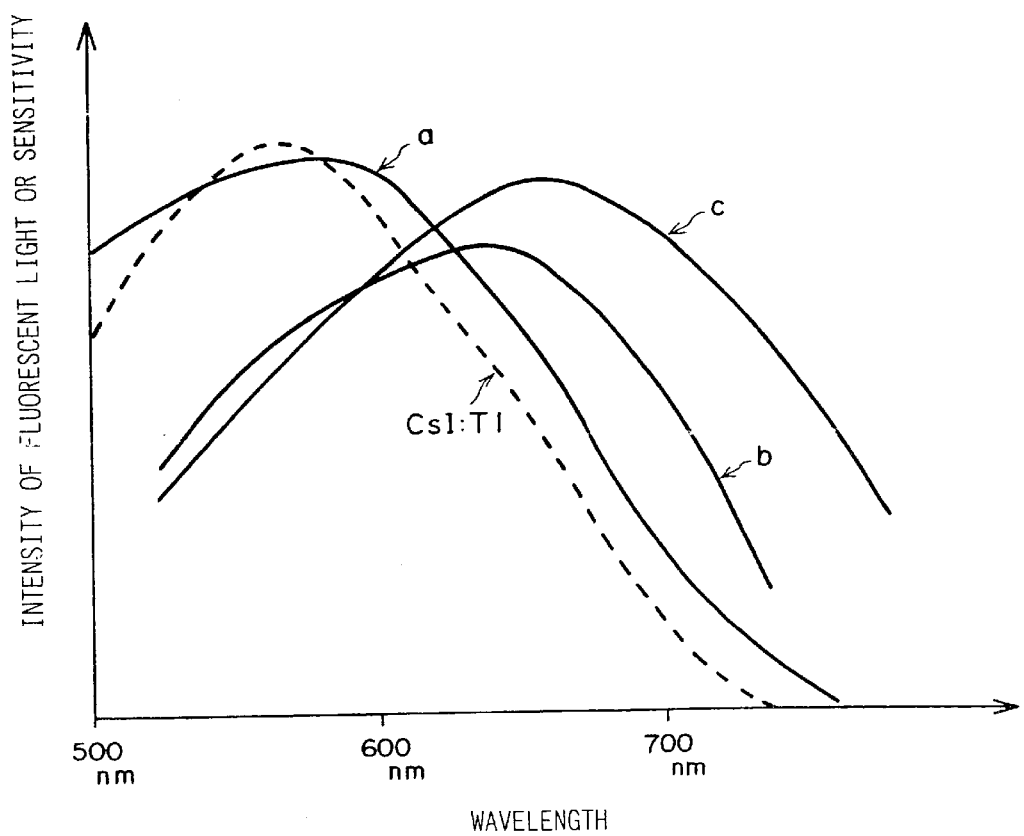
FIG. 6 is a graph indicating an example of the wavelength-light emission characteristic of a scintillator and examples and variations of the wavelength-sensitivity characteristic of each photoelectric conversion element.

FIG. 6 is a graph indicating an example of the wavelength-light emission characteristic of a scintillator and examples and variations of the wavelength-sensitivity characteristic of each photoelectric conversion element. In FIG. 6, the curve a shows a typical wavelength-sensitivity characteristic of the photoelectric conversion element. According to the second method, the center wavelength in the sensitivity of the photoelectric conversion element is shifted to a longer-wavelength side as indicated by the curve b in FIG. 6 by changing the concentration of boron as a dopant, and thus the photoelectric conversion efficiency $\eta$ is reduced to 60%. In this case, the amount Q0 of charges generated in each photoelectric conversion element becomes $Q0=X \cdot L \cdot T \cdot F \cdot \eta = 4.7 \times 10^7$, which is not greater than the maximum storable charge amount $Q=6 \times 10^7$. That is, the aforementioned relationship $Q0=X \cdot L \cdot T \cdot F \cdot \eta \leq Q$ is satisfied.

(1-3) Alternatives to Second Method (Control of Film Formation Condition or Film Thickness)

According to an alternative to the second method, the center wavelength in the sensitivity of the photoelectric conversion element is shifted to a longer-wavelength side as indicated by the curve c in FIG. 6, for example, by changing a film formation speed, and thus the photoelectric conversion efficiency $\eta$ is reduced to 60%. In this case, the amount Q0 of charges generated in each photoelectric conversion element becomes $Q0=X \cdot L \cdot T \cdot F \cdot \eta = 4.7 \times 10^7$, which is not greater than the maximum storable charge amount $Q=6 \times 10^7$. That is, the aforementioned relationship $Q0=X \cdot L \cdot T \cdot F \cdot \eta \leq Q$ is satisfied.

According to a second alternative to the second method, the film thickness of the a-Si:H photoelectric conversion layer 63 is reduced from 1 micrometer to 0.5 micrometers. Accordingly, the photoelectric conversion efficiency $\eta$ is reduced from 80% to 50%, and the capacitance C is increased from 2 pF to 4 pF. In this case, the amount Q0 of charges generated in each photoelectric conversion element becomes $Q0=X \cdot L \cdot T \cdot F \cdot \eta = 4.9 \times 10^7$, which is not greater than the maximum storable charge amount $Q=1.2 \times 10^8$. That is, the aforementioned relationship $Q0=X \cdot L \cdot T \cdot F \cdot \eta \leq Q$ is satisfied.

(1-4) Third Method

According to the third method, the number L of photons which constitute fluorescent light emitted in response to each radiation quantum is reduced to 1,200 by adjusting the concentration of Tl in the CsI:Tl scintillator to 3 ppm. In this case, the amount Q0 of charges generated in each photoelectric conversion element becomes $Q0=X \cdot L \cdot T \cdot F \cdot \eta = 4.7 \times 10^7$, which is not greater than the maximum storable charge amount $Q=6 \times 10^7$. That is, the aforementioned relationship $Q0=X \cdot L \cdot T \cdot F \cdot \eta \leq Q$ is satisfied.

(2) Case 2

In the case 2, the radiation dose is 100 mR, and the number X of radiation quantums received in each pixel is $7 \times 10^5$. In this case, the aforementioned relationship cannot be satisfied by only one of the above three methods. Therefore, a light absorbing member 49 is arranged between the scintillator 41 and the solid-state radiation detector 42, and the film thickness of the a-Si:H photoelectric conversion layer 63 is reduced. For example, when the light absorbing member 49 is arranged so as to achieve an entrance efficiency T of 20%, and the film thickness of the a-Si:H photoelectric conversion layer 63 is reduced, the amount Q0 of charges generated in each photoelectric conversion element becomes $Q0=X \cdot L \cdot T \cdot F \cdot \eta = 1 \times 10^8$, which is not greater than the maximum storable charge amount $Q=1.2 \times 10^8$. That is, the aforementioned relationship $Q0=X \cdot L \cdot T \cdot F \cdot \eta \leq Q$ is satisfied.

(3) Case 3

In the case 3, the radiation dose is 300 mR, and the number X of radiation quantums received in each pixel is $2 \times 10^6$. In this case, the aforementioned relationship cannot be satisfied by the combination of the case 2. Therefore, a light absorbing member 49 realizing an entrance efficiency T of 10% is arranged between the scintillator 41 and the solid-state radiation detector 42, the film thickness of the a-Si:H photoelectric conversion layer 63 is reduced, and the film formation condition is changed. Thus, the amount Q0 of charges generated in each photoelectric conversion element becomes $Q0=X \cdot L \cdot T \cdot F \cdot \eta = 1 \times 10^8$, which is not greater than the maximum storable charge amount $Q=1.2 \times 10^8$. That is, the aforementioned relationship $Q0=X \cdot L \cdot T \cdot F \cdot \eta \leq Q$ is satisfied.

As described above, the dynamic range of the radiation dose in the solid-state radiation detector including a CsI:Tl scintillator and a photoelectric conversion element containing Si as a main component can be extended to a range of about 10 to 300 mR, as indicated by the line b in FIG. 5.

Next, further examples of the solid-state radiation detectors according to the present invention are indicated below for various amounts of the radiation dose. In the following examples, the solid-state radiation detectors include a typical CsI:Na scintillator and a typical photoelectric conversion element containing Se as a main component, the capacitance C of the capacitor portion of each photoelectric conversion element is 2 pF, the voltage V applied to each photoelectric conversion element is 5 V, the maximum storable charge amount Q is $6 \times 10^7 e$ (where e is the elementary charge), the number L of photons which constitute fluorescent light emitted from the CsI:Na scintillator in response to each radiation quantum is 2,000, the fill factor F of each photoelectric conversion element is 70%, and the photoelectric conversion efficiency $\eta$ of each photoelectric conversion element is 20%.

(4) Case 4

In the case 4, the radiation dose is 100 mR, and the number X of radiation quantums received in each pixel is $7 \times 10^5$.

(4-1) First Method (Use of Light Absorbing Member)

According to the first method, an optical filter as the aforementioned light absorption member 49 is arranged between the scintillator 41 and the solid-state radiation detector 42, where the optical filter realizes an entrance efficiency T of 30%. In this case, the amount Q0 of charges generated in each photoelectric conversion element becomes $Q0=X \cdot L \cdot T \cdot F \cdot \eta = 5.9 \times 10^7$, which is not greater than the maximum storable charge amount $Q=6 \times 10^7$.

That is, the aforementioned relationship $Q0=X \cdot L \cdot T \cdot F \cdot \eta \leq Q$ is satisfied.

(4-2) Second Method (Control of Film Formation Condition or Film Thickness)

Figure 7:
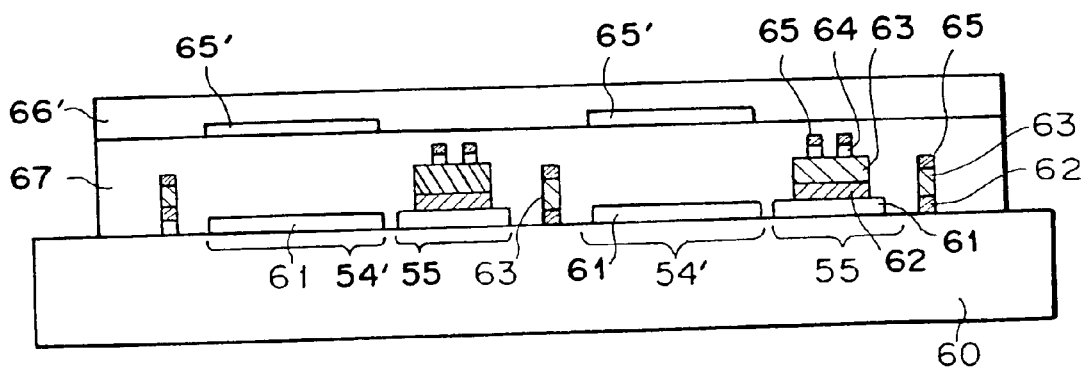
FIG. 7 is a cross-sectional view of a portion of another solid-state radiation detector containing Se as a main component.

When a-Se is used in forming the photoelectric conversion element, it is difficult to form a portion of the photoelectric conversion element made of a-Se by using etching. Therefore, solid-state radiation detectors including a typical CsI:Na scintillator and a typical photoelectric conversion element containing Se as a main component are formed as follows. FIG. 7 is a cross-sectional view of a portion of a solid-state radiation detector containing Se as a main component. The cross section of FIG. 7 corresponds to the cross section of FIG. 4. In FIG. 7, the same elements as the corresponding elements in FIG. 4 bear the same reference numbers, respectively. In addition, only the differences from the solid-state radiation detector of FIG. 4 are explained below.

First, in a similar manner to the process explained with reference to FIG. 4, the pattern of the first metal thin film 61 is formed on the insulator substrate 60, and the switching elements 55 are formed on the corresponding positions on the first metal thin film 61. Thereafter, an a-Se layer 67 is formed so as to cover the first metal thin film 61 and the switching elements 55 formed above, and have a thickness of 0.8 micrometers on areas of the first metal thin film 61 in which the photoelectric conversion elements 54' are to be formed. Next, the second metal thin film 65' which is similar to the second metal thin film 65 in FIG. 4 is formed on areas of the a-Se layer 67 in which the photoelectric conversion elements 54' are to be formed. Thus, the photoelectric conversion elements 54' are formed. For example, each of the first and second metal thin films 61 and 65' can be made of aluminum, and have a thickness of about 0.1 micrometers. Finally, the entire construction formed as above is covered by a protection film 66', which is made of, for example, PET (polyethylene terephthalate). When the above thickness of the a-Se layer 67 on the areas of the first metal thin film 61 in which the photoelectric conversion elements 54' are to be formed is reduced from 0.8 micrometers to 0.2 micrometers, the capacitance C of the capacitor portion of each photoelectric conversion element increases from 2 pF to 8 pF. Thus, the amount Q0 of charges generated in each photoelectric conversion element becomes $Q0 = X \cdot L \cdot T \cdot F \cdot \eta = 2 \times 10^8$, which is not greater than the maximum storable charge amount $Q = 2.5 \times 10^8$. That is, the aforementioned relationship $Q0 = X \cdot L \cdot T \cdot F \cdot \eta \leq Q$ is satisfied.

(5) Case 5

In the case 5, the radiation dose is 300 mR, and the number X of radiation quantums received in each pixel is $2 \times 10^6$. In this case, a light absorbing member 49 is arranged between the scintillator 41 and the solid-state radiation detector 42, and the film thickness of the a-Se photoelectric conversion layer 67 is reduced. For example, the amount Q0 of charges generated in each photoelectric conversion element becomes $Q0 = X \cdot L \cdot T \cdot F \cdot \eta = 1.7 \times 10^8$, which is not greater than the maximum storable charge amount $Q = 2.5 \times 10^8$. That is, the aforementioned relationship $Q0 = X \cdot L \cdot T \cdot F \cdot \eta \leq Q$ is satisfied.

As described above, the dynamic range of the radiation dose in the solid-state radiation detector including a CsI:Na scintillator and a photoelectric conversion element containing Se as a main component can be extended to a range of about 10 to 300 mR, as indicated by the line b in FIG. 5.

What is claimed is:

1. A radiation detector comprising:
    a scintillator which is made of CsI doped with Tl, receives radiation corresponding to a number X of radiation quantums for each of a plurality of pixels, and converts said radiation to fluorescent light so that a number L of photons which constitute the fluorescent light are emitted in response to each radiation quantum, and;
    a plurality of photoelectric conversion elements each of which is provided for one of said plurality of pixels, contains Si as a main component, detects said fluorescent light, and generates charges when said fluorescent light is detected, where each of said plurality of photoelectric conversion elements has a fill factor F and a photoelectric conversion efficiency η, and is arranged so that said fluorescent light enters said each of said plurality of photoelectric conversion elements with an entrance efficiency T; and
    a plurality of capacitor elements each of which is connected to one of said plurality of photoelectric conversion elements, stores said charges generated by said one of said plurality of photoelectric conversion elements, and has a maximum storable charge amount Q;
    wherein when said radiation detector receives a 10 to 300 mR dose of said radiation, said number X, said number L, said entrance efficiency T, said fill factor F, and said photoelectric conversion efficiency η satisfy a relationship $X \cdot L \cdot T \cdot F \cdot \eta \leq Q$.

2. A radiation detector according to claim 1, further comprising a light-absorbing member arranged between said scintillator and said plurality of photoelectric conversion elements so as to decrease said entrance efficiency T.

3. A radiation detector according to claim 1, wherein said scintillator has a wavelength-light emission characteristic, each of said photoelectric conversion elements has a wavelength-sensitivity characteristic, and said wavelength-light emission characteristic and said wavelength-sensitivity characteristic are arranged to be different from each other so as to decrease said photoelectric conversion efficiency η.

4. A radiation detector according to claim 1, wherein said number L is decreased so as to satisfy said relationship.

5. A radiation detector according to claim 1, wherein said plurality of pixels are two-dimensionally arranged, and said plurality of photoelectric conversion elements and said plurality of capacitor elements are arranged corresponding to the plurality of pixels, and integrally formed with said scintillator.

6. A radiation detector comprising:
    a scintillator which is made of CsI doped with Na, receives radiation corresponding to a number X of radiation quantums for each of a plurality of pixels, and converts said radiation to fluorescent light so that a number L of photons which constitute the fluorescent light are emitted in response to each radiation quantum, and;
    a plurality of photoelectric conversion elements each of which is provided for one of said plurality of pixels, contains Se as a main component, detects said fluorescent light, and generates charges when said fluorescent light is detected, where each of said plurality of photoelectric conversion elements has a fill factor F and a photoelectric conversion efficiency η, and is arranged so that said fluorescent light enters said each of said plurality of photoelectric conversion elements with an entrance efficiency T; and
    a plurality of capacitor elements each of which is connected to one of said plurality of photoelectric conversion elements, stores said charges generated by said one of said plurality of photoelectric conversion elements, and has a maximum storable charge amount Q;
    wherein when said radiation detector receives a 10 to 300 mR dose of said radiation, said number X, said number L, said entrance efficiency T, said fill factor F, and said photoelectric conversion efficiency η satisfy a relationship $X \cdot L \cdot T \cdot F \cdot \eta \leq Q$.

7. A radiation detector according to claim 6, further comprising a light-absorbing member arranged between said scintillator and said plurality of photoelectric conversion elements so as to decrease said entrance efficiency T.

8. A radiation detector according to claim 6, wherein said scintillator has a wavelength-light emission characteristic, each of said photoelectric conversion elements has a wavelength-sensitivity characteristic, and said wavelength-light emission characteristic and said wavelength-sensitivity characteristic are arranged to be different from each other so as to decrease said photoelectric conversion efficiency η.

9. A radiation detector according to claim 6, wherein said number L is decreased so as to satisfy said relationship.

10. A radiation detector according to claim 6, wherein said plurality of pixels are two-dimensionally arranged, and said plurality of photoelectric conversion elements and said plurality of capacitor elements are arranged corresponding to the plurality of pixels, and integrally formed with said scintillator.

* * * * *